United States Patent [19]
Lund et al.

[11] Patent Number: 5,905,002
[45] Date of Patent: May 18, 1999

[54] LEAD ACID STORAGE BATTERY

[75] Inventors: David L. Lund, Minneapolis; William H. Kump, West St. Paul, both of Minn.; Rodger Willing, Batavia, Ill.

[73] Assignee: GNB Technologies, Inc., Mendota Heights, Minn.

[21] Appl. No.: 08/903,466

[22] Filed: Jul. 30, 1997

Related U.S. Application Data

[63] Continuation-in-part of application No. 08/799,294, Feb. 13, 1997.

[51] Int. Cl.$^6$ ...................................................... H01M 2/30
[52] U.S. Cl. .......................... 429/180; 429/178; 29/623.1
[58] Field of Search ..................................... 429/180, 178; 29/623.1, 623.2; 219/633, 635

[56] References Cited

U.S. PATENT DOCUMENTS

| | | |
|---|---|---|
| 2,066,597 | 1/1937 | West ...................................... 429/180 X |
| 2,753,620 | 7/1956 | Yardney . |
| 3,598,171 | 8/1971 | Scholz . |
| 3,849,203 | 11/1974 | Hollis et al. . |
| 4,050,501 | 9/1977 | Eberle . |
| 4,422,494 | 12/1983 | Chafin et al. . |
| 4,501,943 | 2/1985 | Lund . |
| 4,523,068 | 6/1985 | Lund et al. . |
| 4,683,647 | 8/1987 | Brecht et al. ........................... 29/623.2 |
| 4,903,753 | 2/1990 | Golz . |
| 5,626,984 | 5/1997 | Albini .................................. 429/180 X |

FOREIGN PATENT DOCUMENTS

| | | |
|---|---|---|
| 1201339 | 8/1970 | United Kingdom . |
| 1381250 | 8/1972 | United Kingdom . |
| 1297371 | 11/1972 | United Kingdom . |
| 1311403 | 3/1973 | United Kingdom . |
| 1362890 | 8/1974 | United Kingdom . |

*Primary Examiner*—John S. Maples
*Attorney, Agent, or Firm*—Leydig, Voit & Mayer, Ltd.

[57] ABSTRACT

A lead acid storage battery and improved method of bonding battery cell terminal posts to cover bushings is disclosed. The battery cell terminal posts are made of lead alloy material and the cover bushings are made of solder alloy material having a significantly lower melting point than the terminal posts. The bushings are bonded to the terminal posts by heating the terminal posts and bushings to a temperature above the melting point of the material of the bushing, but below the melting point of the material of the post, to effect a secure and leak proof connection without melting of the terminal posts and with lesser chance for damage to the plastic cover. The plastic cover further includes integrally formed annular mold sections in the form of upstanding bosses which completely surround respective bushings and posts to contain melted material of the bushing during the heating operation and to form the terminals into final shape.

11 Claims, 3 Drawing Sheets

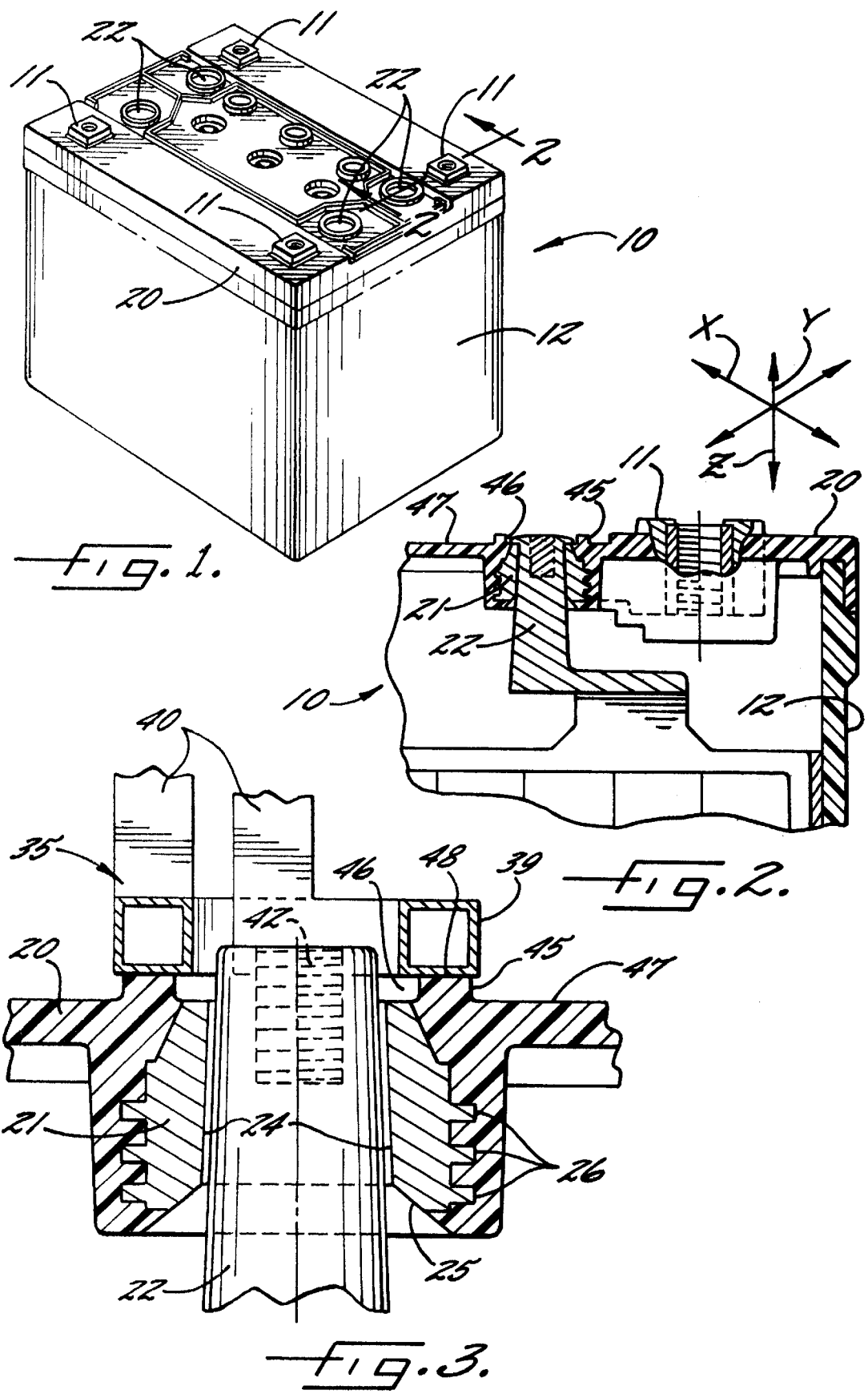

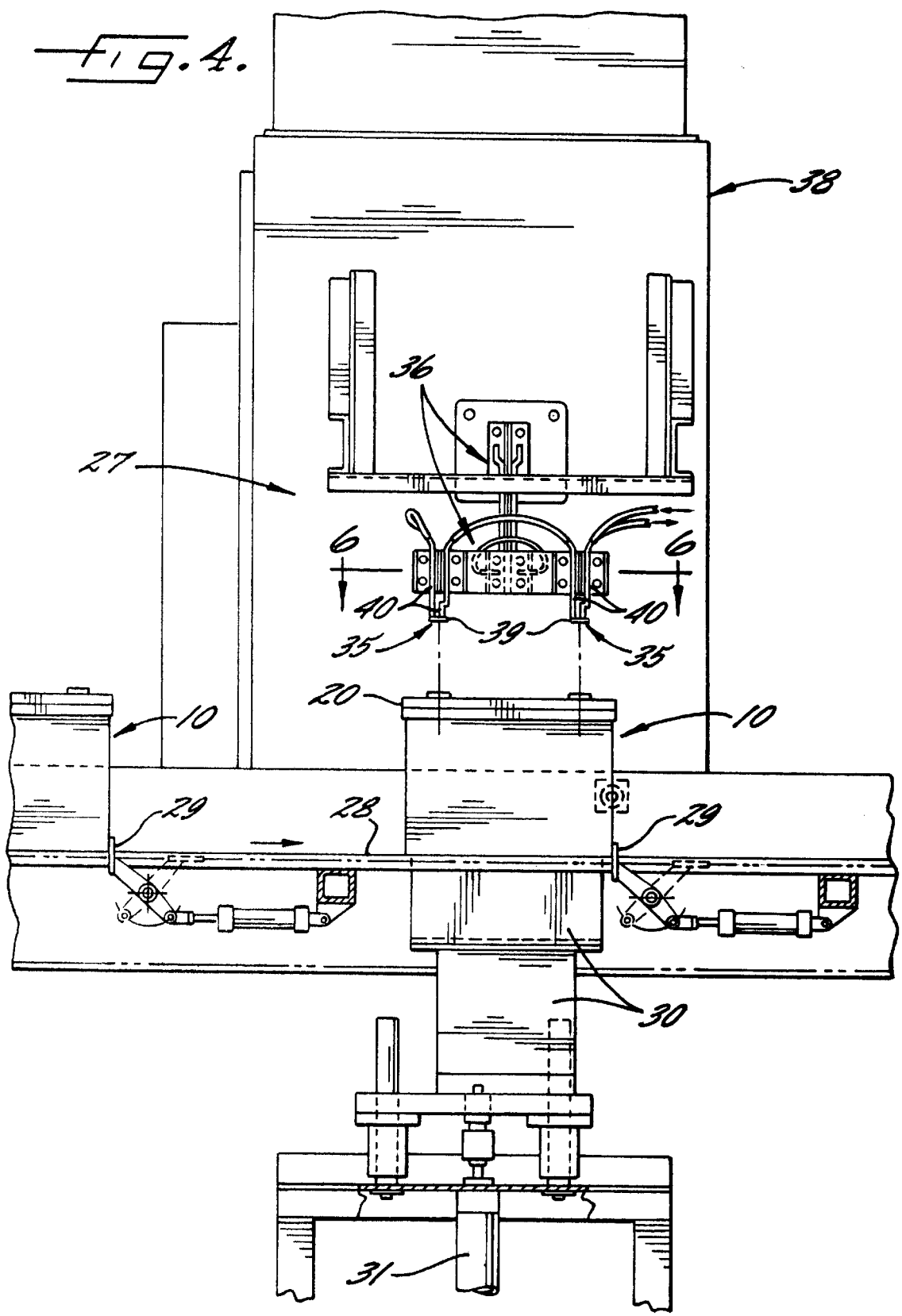

LEAD ACID STORAGE BATTERY

RELATED APPLICATION

This is a continuation-in-part of my co-pending application Ser. No. 08/799,294 filed Feb. 13, 1997, the disclosure of which is incorporated herein by reference.

FIELD OF THE INVENTION

The present invention relates generally to batteries, and more particularly, to an improved method for bonding battery cell terminal posts to respective bushings in the battery casing to form terminals of the completed battery.

BACKGROUND OF THE INVENTION

In the manufacture of lead acid industrial and automotive storage batteries, it is customary to mold lead bushings in the plastic cover of the battery and to thereafter fuse the bushings to posts of the battery cell assemblies. Typically both the posts and bushings must be heated to temperatures above their melting points such that there is a fusion of the materials of the two components.

It has long been the practice to melt the ends of the posts and bushings by means of manually operated acetylene torches. Not only does such manual acetylene torch burning of the posts and bushings fail to lend itself to use in fully automated battery production lines, the quality and depth of the fused areas cannot be uniformly controlled. Moreover, particular care must be taken in not melting or otherwise damaging the portion of the plastic cover immediately adjacent the bushing, which can render the battery defective or sufficiently weaken the seal and support between the plastic cover and bushings as to create a potentially dangerous condition during use of the battery. Such acetylene torch burning, furthermore, is tedious and potentially harmful to the working environment, and it is difficult to control the flow of melted lead, resulting in unsightly irregularities in the surfaces of the finished battery terminals.

While various proposals have been made for automatically fusing battery terminal posts and cover bushings by means of acetylene torch heating, tungsten inert gas welding, electrical resistance heating, and electrical induction heating, such proposals all have faced various drawbacks, including the inability to obtain reliable fusion depths within the requisite processing time, undesirable melting of the cover about the bushings, unacceptable appearance of the finished terminals, or the necessity for utilizing auxiliary molds to control melted lead and achieve acceptable terminal appearance.

OBJECTS AND SUMMARY OF THE INVENTION

It is an object of the present invention to provide a method of bonding battery cell posts and casing bushings in forming battery terminals which can be carried out at lower heating temperatures than heretofore possible, and hence, reduces the possibility for melting of the plastic cover or damaging the seals between the bushings and the plastic cover.

Another object is to provide a method as characterized above that can be carried out without heating the battery cell posts above their melting temperature. A related object is to provide such a method that can be optimally controlled to more reliably prevent melting and damage of the plastic cover.

A further object is to provide a lead acid storage battery in which posts and cover bushings are bonded to form the battery terminals without the necessity for fusing and intermixing materials of the two components typical of the prior art.

Yet another object is to provide a lead acid storage battery of the above kind in which the cover bushings are formed of a solder material having a substantially lower melting temperature than the lead alloy of the battery cell posts to which they are bonded.

Another object is to provide a lead acid storage battery in which the cover has integrally formed mold sections completely surrounding the posts and bushings to form dams for the melted bushings during bonding and which mold the terminals in finished form.

A further object is to provide a battery of the foregoing type in which the integral mold sections of the cover aesthetically and protectively contain the battery terminals for the life of the battery.

Still another object is to provide such a lead acid storage battery in which the integral mold sections of the cover provide an alignment reference for positioning induction heating coils during bonding of the terminal posts and bushings for enhancing uniformity of the resulting bonds in automated battery production lines.

Yet another object is to provide a battery of the foregoing type in which the integral mold sections are bonded to a final outer cover of the battery to form a redundant seal between the cover and bushings for long term reliable usage.

Other objects and advantages of the invention will become apparent upon reading the following detailed description and upon reference to the drawings, in which:

BRIEF DESCRIPTION OF THE DRAWINGS

FIG. 1 is a perspective of a lead acid storage battery embodying the present invention;

FIG. 2 is an enlarged fragmentary section of one of the fused terminals of the battery shown in FIG. 1, taken in the plane of line 2—2;

FIG. 3 is an enlarged fragmentary section showing a battery in operatively positioned relation to an induction heating coil of the induction heating apparatus shown in FIG. 4, prior to bonding of the terminal post and cover bushing;

FIG. 4 is a front elevation view of the illustrated induction heating apparatus;

Figure 5:
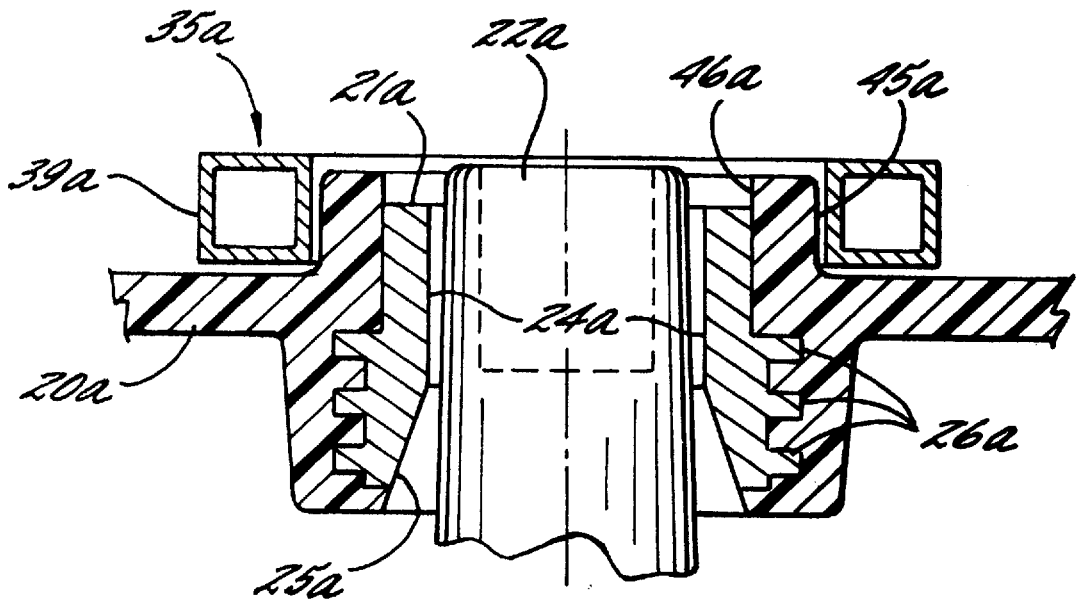
FIG. 5 is a fragmentary section of an alternative method of bonding the bushing and post.

While the invention is susceptible of various modifications and alternative constructions, certain illustrated embodiments thereof have been shown in the drawings and will be described below in detail. It should be understood, however that there is no intention to limit the invention to the specific forms disclosed, but on the contrary, the intention is to cover all modifications, alternative constructions and equivalents falling within the spirit and scope of the invention.

DETAILED DESCRIPTION OF THE DRAWINGS

Referring now to FIGS. 1 and 2 of the drawings, there is shown an illustrative lead acid storage battery having terminals 11 on a top side thereof. The illustrated battery 10 includes a case 12, preferably made of plastic, containing a plurality of battery cell elements that are electrically coupled to the terminals 11.

During manufacture of lead acid storage batteries of such type, it is customary to assemble onto the case 12 a cover 20 having terminal bushings 21 mounted therein with terminal posts 22 of the battery cell elements extending upwardly through respective bushings 21, as depicted in FIG. 3. The terminal posts 22, which may be made of a conventional lead alloy, have a slight upward external taper and are positionable into respective tapered axial openings 24 of the bushings 21 shaped generally complementary to the terminal posts 22.

The lowermost end of each bushing opening 24 has an outwardly flared chamfer 25 for guiding the respective terminal post 22 into proper seating relation to the bushing 21 during assembly of the cover 20 onto the case 12. For reliably supporting the bushings 21 in the cover 20, the bushings 21 each have a ribbed outer peripheral mounting portion 26 adapted to provide a strong mechanical connection with the plastic cover 20, while forming an effective seal about the periphery of the cover and bushing.

For bonding the terminal posts 22 and bushings 21, an induction heating apparatus 27 is provided that preferably is part of an automated production line having a conveyor track 28 upon which batteries 10 to be assembled are moved through successive operating stations (FIG. 4). A plurality of selectively actuatable pivotal stops 29 are mounted on an underside of the track 28 for stopping the batteries at predetermined operating stations, including an induction heating station, as shown in FIG. 4. An elevator 30 operated by an air cylinder 31 successively lifts the battery 10 off the track 26 at the induction heating station to position the terminal posts 22 and bushings 21 thereof into operative relation for an induction heating cycle and therefore returns the battery to its lowered position on the track 28 for further transfer and processing.

The induction heating apparatus 27, which is described in more detail in the above referenced application Ser. No. 08/799,294, includes a plurality of induction heating coils 35 that are operable for effecting simultaneous bonding of a corresponding number of terminal posts 22 and bushings 21 of batteries being processed. The coils 35 are mounted on a T bus 36 supported in cantilever fashion from a high voltage, induction heating generator 38, for example, having a 30 kilowatt capacity at 450 kHz.

Each inducting heating coil 35 is formed from a respective continuous length of copper tubing, which in this case defines an annular coil turn 39 and a pair of upstanding mounting legs 40 adjustably supported by the T bus 36 for selective vertical positioning along a Z or vertical axis. While in the illustrated embodiment the coils 35 are shown as having a single annular turn 39, it will be understood that the coils may be formed with a multiplicity of helical turns. For purposes herein, the term "coil" encompasses inducting heating coils having one or more turns.

In accordance with an important aspect of the invention, the bushings and posts can be bonded at significantly lower induction heating temperatures than heretofore possible. More particularly, the bushings are made of a material having an appreciably lower melting temperature than the terminal posts, and during an induction heating cycle, the terminal posts and bushings are heated to a temperature range above the melting point of the bushings, while remaining below the melting point of the terminal posts. To this end, in the illustrated embodiment, the bushings 21 are made of a solder alloy material, preferably having a melting temperature at least about 100 degrees F. lower than the melting temperature of the lead alloy material of the terminal posts 22. Assuming that the terminal posts are made of a conventional lead alloy material, such as Pb and Sb and/or Sn alloys, which have melting temperatures of about 600 degrees F., a solder material such as a eutectic (minimum melting point) alloy of lead and antimony may be used, which has a melting point of about 477 degrees. It will be understood that other solder alloy materials could be used so long as the material is not subject to extensive corrosion during prolonged exposure to battery strength sulfuric acid electrolyte and will not contaminate the lead acid battery chemistry.

During an induction heating cycle, it has been unexpectedly found that the terminal posts 22 and bushings 21 need only be heated to a temperature above the melting point of the solder alloy of the bushings 21 to achieve secure bonding between the bushings 21 and the terminal posts 22. Suitable fluxes of a known type may be used at the terminal post-bushing interface to enhance solder bonding between the bushing and post. While the resulting bonds are not fused in the sense of the prior art wherein melted materials of the bushing and terminal post intermix and fuse together, the resulting bond is sufficient to achieve a mechanically strong and leak-free connection between the post and bushing that will withstand long term usage of the battery.

It will be understood by one skilled in the art that the bushings 21 need not be designed for current carrying capabilities. Instead, the battery cell terminal posts 22 can be sized for conducting the rated operating current of the battery during usage In the illustrated embodiment, to enhance current conduction through the terminal posts 22, each terminal post 22 has a cylindrical copper insert 42 threaded concentrically into an upper end thereof.

By appropriate selection of lead and solder alloy materials for the battery terminal posts 22 and bushings 21, it will be understood that bonding between the two elements can be optimally and uniformly controlled even in an automated production line. Since such bonding can be quickly effected at induction heating temperatures lower than heretofore possible, batteries can be produced with increased productivity and with lesser likelihood of damage to the plastic cover or the seal between the plastic cover and bushing.

In accordance with a further aspect of the invention, the battery cover has integrally formed mold sections 45 that completely surround each bushing 21 and post 22 to define a dam 46 for controlling melted material of the bushing 21 during an induction heating operation and for forming the battery terminal in finished shape. In the illustrated embodiment, each integral mold section 45 is in the form of an upstanding annular boss or lip substantially concentric with the post 22 and bushing 21 to be bonded. Each mold section 45 protrudes upwardly a relatively small distance L, such as on the order of 0.060 inches, from the top surface of the bushing 21. Since the mold sections 45 completely encompass the bushings 21 and posts 22, they both contain melted material of the bushing during a bonding operation and mold the battery terminals in finished form. With the mold sections 45 being an integral part of the cover 20, there also is no need to deliver or otherwise provide a separate auxiliary molds to the battery during the induction heating operation. Furthermore, being an integral part of the battery cover, the mold sections 45 aesthetically and protectively contain the formed battery terminals throughout the life of the battery. While the illustrated mold sections 45 are annular bosses concentric to the terminal posts 22 and bushings 21 to be bonded, it will be understood that the mold sections may have other, non-concentric configurations.

In keeping with the invention, the integral mold sections of the cover further define a reference for reliable and repeatable location of the induction heating coils 35 with respect to the battery during induction heating cycles for facilitating uniform bonding of the terminal posts and bushings even in automated battery production lines. As depicted in FIG. 3, the annular mold sections 45 of the cover 20 each define a flat upper reference surface 48 for engagement with a respective induction heating coil turn 39, such as upon upward movement of the battery 10 by the elevator 30. Hence, when the battery 10 is moved into operative relation to the induction heating apparatus 27, each reference surface 48, as defined by the respective integral mold section 45, is brought into engaging relation with an underside of a respective annular coil turn 39 for establishing a repeatable, predetermined position of the bushing 21 and the terminal post 22 relative to the coil. In the illustrated embodiment, in such seated position each coil is spaced slightly above the upper end of the respective bushing 21, with the post 22 extending partially, in this case about midway, into the annular opening defined by the coil.

With the coil turn 39 in such predetermined spaced relation to both the bushing 21 and terminal post 22, upon energization of the induction heating generator 38, current flow through the T bus 36 and coils 35 induces substantially instantaneous and uniform high voltage heating in the bushings 21 and posts 22 disposed in co-axial relation to the coils. It will be understood by one skilled in the art that by selective operation of the induction heating apparatus 27, such induction heating can be controlled to consistently heat the bushings 21 to a narrow temperature range that is above the melting point of the solder alloy material of the bushing, but below the melting point of the lead alloy material of the terminal post. Because of the substantially uniform orientation of each coil 35 of the induction heating apparatus 27 relative to the bushings 21 and terminal posts 22, bonding of the bushings and terminal posts can be uniformly effected without damage to the surrounding plastic material of the cover 20. While in the illustrated embodiment the integral mold sections 45 of the battery cover 20 are described in connection with bonding of solder alloy bushings to lead alloy terminal posts, it will be understood that such integral mold sections of the cover are equally advantageous when fusing conventional lead alloy bushings and posts by induction heating.

Referring now to FIG. 5, there is shown an alternative embodiment of the invention wherein items similar to those described above have been given similar reference numerals with distinguishing suffix "a" added. In this embodiment, the upstanding mold sections 45a of the battery cover 20a are designed to fit concentrically within the induction heating coil turn 39a for locating the battery terminal posts 22a and bushings 21a to be bonded in the horizontal plane, i.e. X and Y directions, as well as in the vertical, i.e., Z direction. The mold sections 45a preferably are slightly smaller in diameter than the annular turn 39a of the coil for enabling easy positioning of the mold sections 45a into the annular coil turns 39a in an automated production line, while establishing a reference for the terminal posts and bushings in the X and Y directions. It will be understood that the induction heating coil may have appropriate probes that are engageable with a top surface of the cover 20a for establishing predetermined vertical positioning of the battery with respect to the coil.

Figure 6:
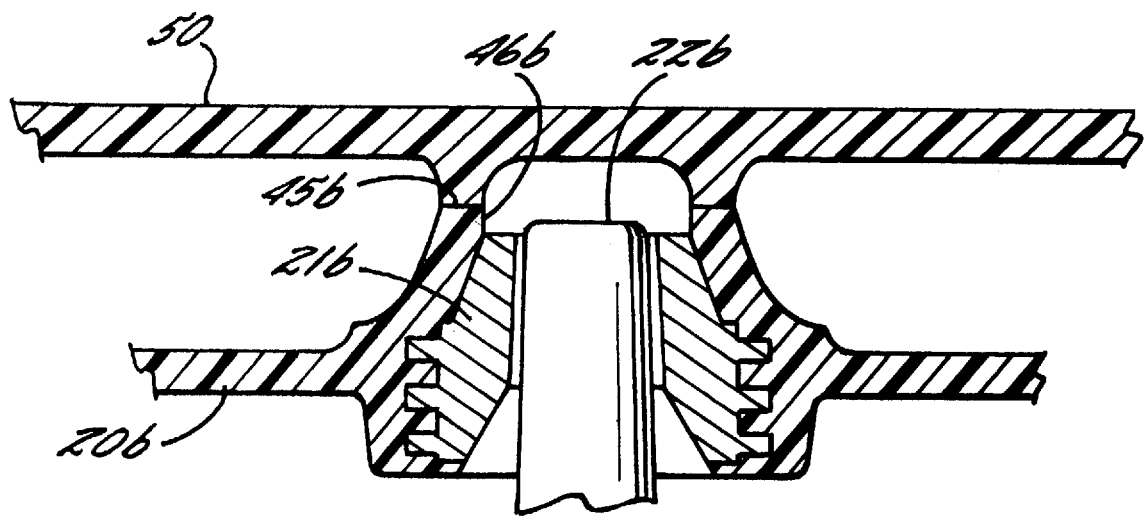
FIG. 6 is a fragmentary selection of another embodiment of a lead acid storage battery according to the present invention.

Referring now to FIG. 6, another alternative embodiment of a battery in accordance with the invention is shown wherein items similar to those described above have been given similar reference numerals with the distinguishing suffix "b" added. In this embodiment, the bushings 21b to be bonded are mounted in an intermediate cover 20b of the battery and an outer or final cover 50 is mounted on the battery case in vertically spaced relation above the intermediate cover 20b. The intermediate cover 20b in this case has integral formed mold sections 45b extending upwardly into sealing contact with the final or outer cover 50 to provide a redundant hermetic seal about the formed terminal. It will be understood that after induction heating bonding or fusion of the bushings and post, as previously described, the final cover 50 may be positioned onto the battery case and bonded to the upper perimeter of the mold sections 45b, such as by sonic welding. The upstanding mold sections 45b again provide cavities 46b for the molten bushing material during induction heating, protectively contain the finished battery terminals, define a reference for the induction heating coils, and in addition, provide a redundant hermetic seals about the bushing and terminal posts in the finished battery.

From the foregoing, it can be seen that since the terminal posts and bushings need only be heated above the relatively lower melting point of the bushings, the induction heating operation can be carried out at lower temperatures than heretofore possible, thereby reducing the possibility for damage to the plastic cover. Since the integral form mold sections of the cover completely surround, contain and shape any melted material of the bushing during the bonding operation, there is no necessity for the delivery and handling of separate molds. The method further lends itself to efficient and economical manufacture in automated production lines.

What is claimed is:

1. A lead acid storage battery comprising a battery case, a plurality of battery cells dispersed in said case, said battery cells having at least one terminal post made of an alloy material, a cover, at least one bushing mounted in said cover, said cover being positionable on said case with said post extending through said bushing, and said bushing being made of an alloy material having a lower melting point than the alloy material of said terminal post which can be securely bonded to the terminal post by heating the bushing to a temperature above its melting point but below the melting point of the terminal post.

2. The storage battery of claim 1 in which said bushing is made of a material having a melting point at least about 100 degrees F. below the melting point of said terminal post.

3. The storage battery of claim 1 in which said post is made of a lead alloy material and said bushing is made of a solder alloy material.

4. The storage battery of claim 3 in which said solder alloy material has a melting point at least about 100 degrees F. below the melting point of said lead alloy material.

5. The storage battery of claim 1 in which cover has an integrally formed upstanding mold section surrounding the bushing and post.

6. The storage battery of claim 5 in which said mold section completely surrounds the bushing and post.

7. The storage battery of claim 6 in which said mold section is an annular boss that completely surrounds said bushing.

8. The storage battery of claim 1 in which said cover is made of a plastic material that is molded in surrounding contacting relation about a side wall of the bushing for supporting the bushing in the cover.

9. A lead acid storage battery comprising a battery case, a plurality of battery cells disposed in said case, said battery cells having at least one terminal post made of an alloy material, a cover, a bushing made of an alloy material mounted in said cover, said cover being positionable on said case with said post extending through said bushing and being fused to said bushing, and said cover having an integral, upstanding mold section completely surrounding said bushing and extending above all upper perimeter of said bushing for containing any flow of the alloy material of the bushing during fusion to said post.

10. The storage battery of claim 9 in which said mold section is an annular boss.

11. A lead acid storage battery comprising a battery case, a plurality of battery cells disposed in said case, said battery cells having at least one terminal post, a cover, a bushing mounted in said cover, said cover being positionable on said case with said post extending through said bushing and being rigidly connected to said bushing, said cover having an integral, upstanding mold section in the form of an annular boss completely surrounding said bushing, an outer battery cover mounted in vertically spaced relation above said cover within which said bushing is mounted, and said boss being bonded to an underside of said outer cover.

* * * * *